United States Patent [19]
Sakashita

[11] Patent Number: 5,905,451
[45] Date of Patent: May 18, 1999

[54] VEHICULAR NAVIGATION SYSTEM

[75] Inventor: Naohiro Sakashita, Oobu, Japan

[73] Assignee: Denso Corporation, Kariya, Japan

[21] Appl. No.: 08/839,983

[22] Filed: Apr. 24, 1997

[30] Foreign Application Priority Data

Apr. 24, 1996 [JP] Japan .................................. 8-102963

[51] Int. Cl.[6] .................................................. G08G 1/123
[52] U.S. Cl. ........................... 340/988; 340/990; 340/995;
701/201; 701/202; 701/204; 701/206; 701/209;
701/210
[58] Field of Search ..................... 340/988, 990,
340/995; 701/200, 201, 202, 203, 204,
205, 206, 209, 210, 211; 345/146

[56] References Cited

U.S. PATENT DOCUMENTS

| | | | |
|---|---|---|---|
| 5,243,528 | 9/1993 | Lefebvre | 701/211 |
| 5,383,128 | 1/1995 | Nishida et al. | 701/210 |
| 5,537,324 | 7/1996 | Nimura et al. | 701/208 |
| 5,635,953 | 6/1997 | Hayami et al. | 345/146 |
| 5,638,280 | 6/1997 | Nishimura et al. | 701/209 |
| 5,652,706 | 7/1997 | Morimoto et al. | 701/210 |

FOREIGN PATENT DOCUMENTS

| | | |
|---|---|---|
| 4-204482 | 7/1992 | Japan . |
| 6-266998 | 9/1994 | Japan . |
| 7-243859 | 9/1995 | Japan . |

*Primary Examiner*—Benjamin C. Lee
*Attorney, Agent, or Firm*—Pillsbury Madison & Sutro LLP

[57] ABSTRACT

A vehicular navigation system capable of establishing a path to a destination to include a road frequently used by the user. First, the present position of the vehicle is located. A road map containing the present position is displayed on the viewing screen of the navigation system. A decision is made as to whether the present position is proximate to any registered location. If so, a nearby road is selected as a road to be used by the vehicle. The path is established to include this nearby road. The navigation system guides the user through this path.

23 Claims, 19 Drawing Sheets

|  REGISTERED SITE MEMORY AREA 1 | | | | REGISTERED SITE MEMORY AREA 2 | | |
| --- | --- | --- | --- | --- | --- | --- |
| SITE (COORD) | ELAPSED TIME | TRAVEL DISTANCE | COUNTER VAL. | REGISTERED SITE (COORD) | ELAPSED TIME | TRAVEL DISTANCE |
| ------ | ------ | ------ | ------ | ------ | ------ | ------ |

| REGISTERED SITE (COORD) | START POINT | | | | END POINT | | | |
|---|---|---|---|---|---|---|---|---|
| | I | II | III | IV | I | II | III | IV |
| $X_0, Y_0$ | $X_{m1}, Y_{m1}$ | $X_{m2}, Y_{m2}$ | $X_{m3}, Y_{m3}$ | $X_{m4}, Y_{m4}$ | $X_{n1}, Y_{n1}$ | $X_{n2}, Y_{n2}$ | $X_{n3}, Y_{n3}$ | $X_{n4}, Y_{n4}$ |

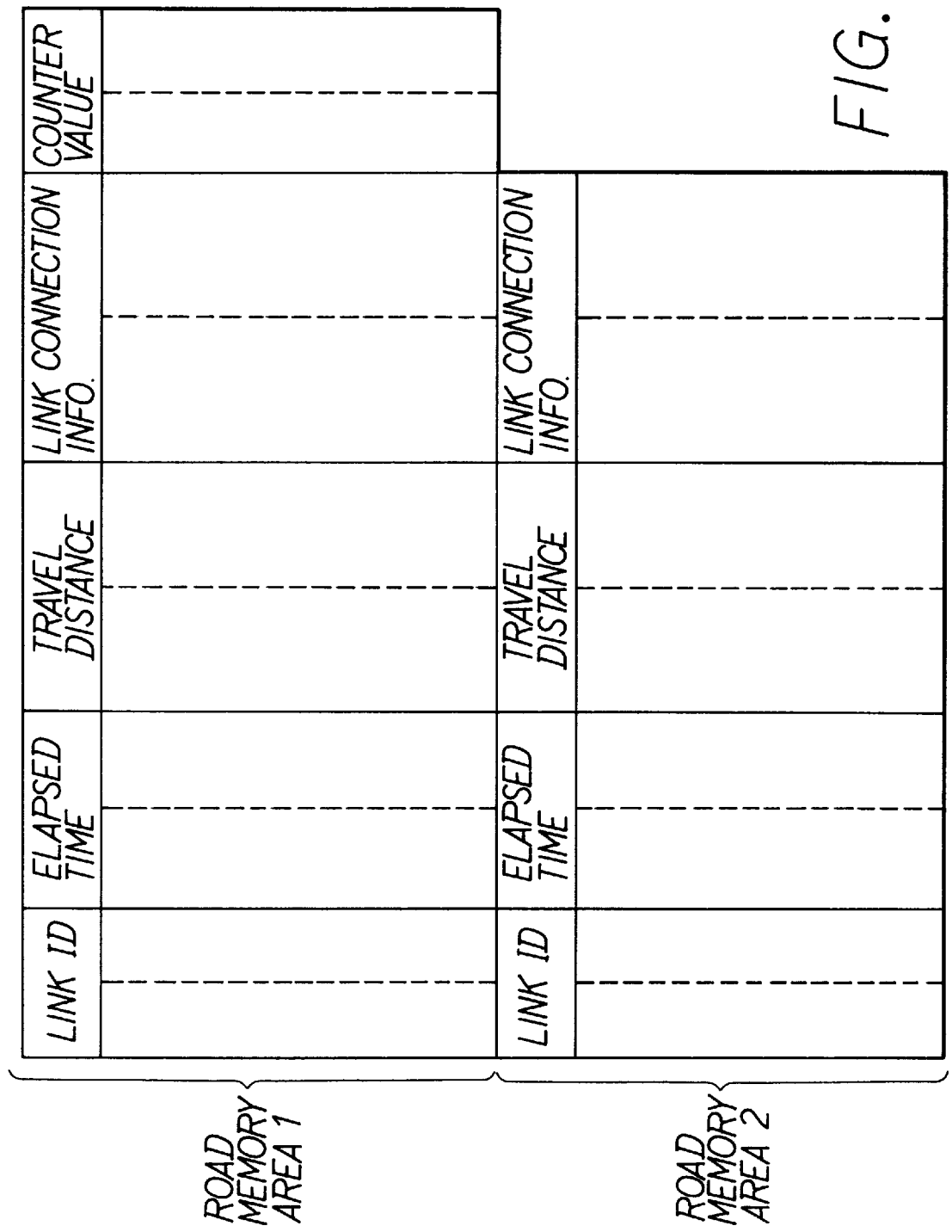

VEHICULAR NAVIGATION SYSTEM

CROSS-REFERENCE TO RELATED APPLICATION

This application is related to and claims priority from Japanese Patent Application No. Hei 8-102963 filed Apr. 24, 1996, incorporated herein by reference.

BACKGROUND OF THE INVENTION

1. Field of the Invention

The present invention relates to a vehicular navigational system for guiding a driver through an established path to a destination.

2. Description of Related Art

In prior art navigational systems of this kind, a road used to establish a path to a destination is taken as a link connecting nodes. If a path going from the starting place to the destination is established using this link, then the road is displayed on a road map in highlighted or thickened form, or verbal instructions are issued to indicate the direction of movement of the vehicle along the path. In this way, the path going to the destination is shown.

It is to be noted, however, that the driver does not always go through the established path. Rather, he or she might go through a favorite or more familiar road. This is now described in detail by referring to FIG. 22A, where the driver's house is indicated by "X". It is assumed that a road indicated by the solid arrowhead line is included in the path, and that another road indicated by the broken arrowhead line is outside the path. Both roads are close to the driver's house. Even if a location indicated by the circle and existing on the road closest to his house is established within the path to urge the user to go in the direction indicated by the solid arrowhead line, the driver might go through the road indicated by the broken arrowhead line. Referring next to FIG. 22B, even if the path is established to include a road indicated by the solid arrowhead line, the driver might go through a detour indicated by the broken arrowhead line. In this manner, with the prior art navigational system, it is impossible to establish a path which takes account of the driver's experiences, practice, and habit.

SUMMARY OF THE INVENTION

In view of the foregoing problems of the prior art, it is an object of the invention to provide a vehicular navigation system capable of establishing a path to a destination which takes the driver's experiences, practice, habit and the like into consideration.

The above object is achieved according to a first aspect of the present invention by providing a storage device for storing data about registered locations and nearby roads and means for establishing a path to a destination using the data about roads included in the path and data about the aforementioned nearby roads.

Accordingly, the navigational system can establish the path to include a road that is close to one of the registered locations and routinely or often used by the user. The system can guide the user through the path according to the user's experiences, practice, and habit. Where data about a road running close to one of the registered locations is stored, the navigational system is preferably equipped with a means for making a decision as to whether the vehicle is currently traveling close to the registered location based on the detected present position. Data about the actually used road that is near the registered position is stored in memory.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 7 is a diagram showing the structure of registered location storage areas in the first embodiment;

FIG. 18 is a table showing the structure of a memory for storing data about starting places and destinations in the second embodiment;

FIG. 21 is a diagram showing the structure of road storage areas in the third embodiment.

DETAILED DESCRIPTION OF THE PRESENTLY PREFERRED EXEMPLARY EMBODIMENTS

Figure 1:
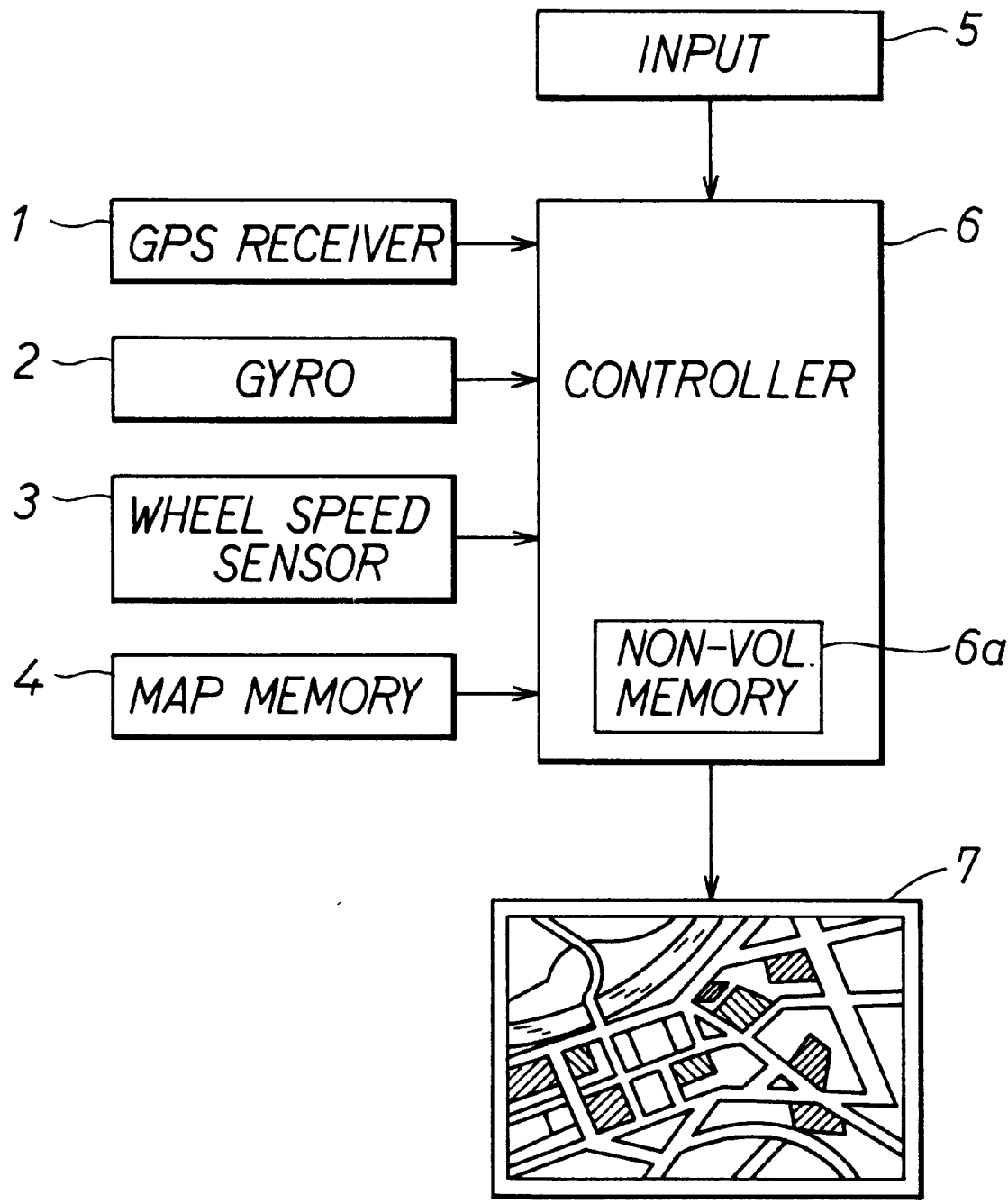
FIG. 1 is a block diagram of a vehicular navigational system according to a first preferred embodiment of the present invention.

FIG. 1 shows a vehicular navigational system according to a first preferred embodiment of the present invention. This system comprises a GPS receiver 1, a gyro 2, and wheel speed sensors 3 (only one is shown) to detect the present position of the vehicle. The GPS receiver 1 receives radio waves from a satellite and produces a signal indicating the present position of the vehicle. The gyro 2 produces a signal corresponding to the angular velocity of the vehicle. Each wheel speed sensor 3 finds the distance traveled by the vehicle from the rotational speed of a corresponding vehicle wheel and delivers a speed signal representative thereof.

A map data memory 4 is equipped with a storage medium such as a CD-ROM in which data about maps are stored. The map data memory 4 sends map data to a controller 6. An input device 5 has various input keys operated by the driver of the vehicle and produces various signals necessary for guiding the driver through a path, the signals being entered into the controller 6. This controller 6 includes a microprocessor or the like, receives the output signals from the components 1–5, displays a road map containing a path to be followed on a display device 7, and performs operations for displaying the present location of the vehicle on the road map. Where a path to a destination is to be displayed to guide the user, the controller 6 establishes the path to the destination and performs operations to display the path to the destination on the display device 7 in highlighted form.

This controller 6 is further equipped with a nonvolatile memory 6a in which data about registered locations, roads close to the registered locations, a starting place, an ending point, etc. are stored even if the vehicle is not in motion (e.g., the ignition switch is off) as described later. That is, the contents of the nonvolatile memory 6a are not lost when power to the memory is removed. The display device 7 is installed in the instrument panel of the vehicle and displays a road map representing the present position, as well as roads. A liquid crystal display, a CRT, or the like can be used as this display device 7.

Figure 2:
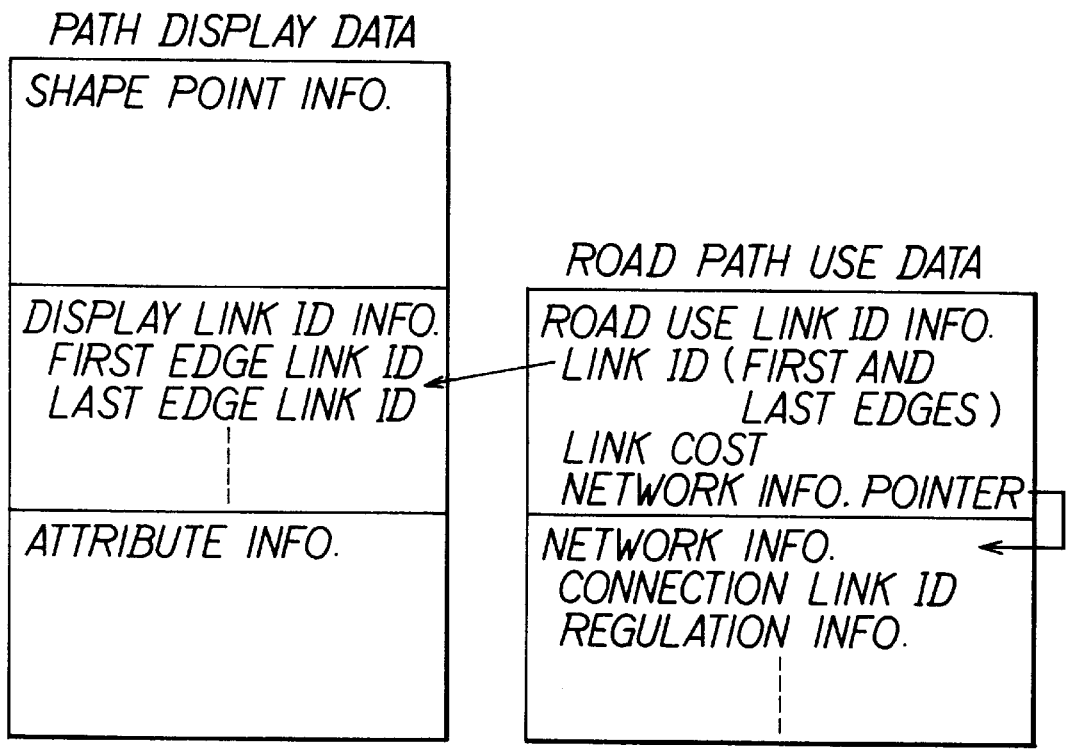
FIG. 2 is a diagram showing a map data structure used by the navigational system of FIG. 1.

FIG. 2 shows the structure of the above-described map data. This map data is composed of data about roads to be displayed and data about roads included in a path. The data about the displayed roads comprises information about shapes and. points used to display a road map, information about the identifiers of links to be displayed, and information about their attributes.

The information about the shapes and points is used to define the shape of each road by means of a set of links specified in terms of two-dimensional coordinates. Each road is divided into strokes by the links. Data about the coordinates of these links is stored for each road.

Figure 3:
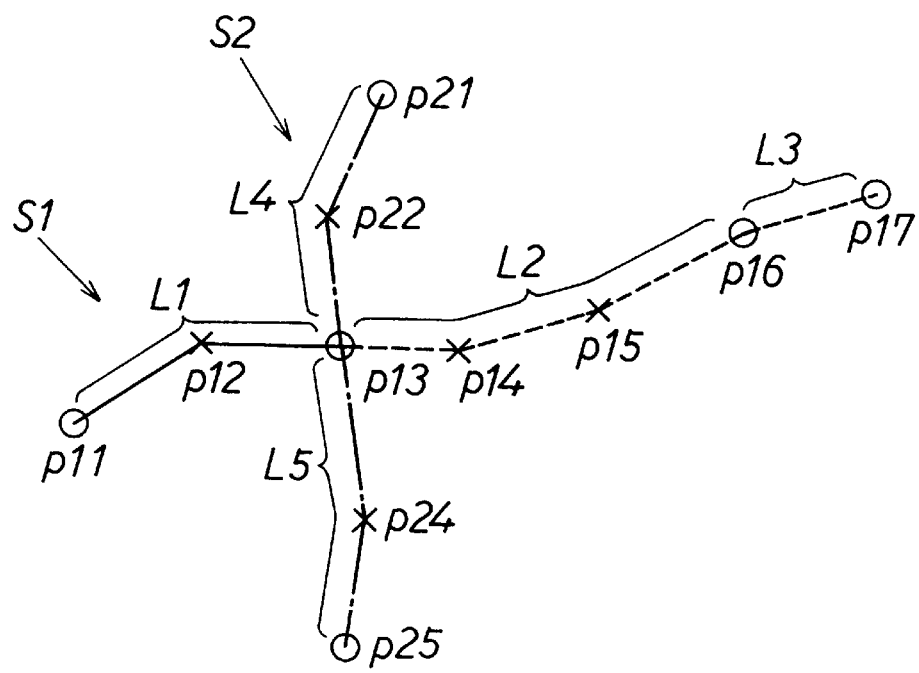
FIG. 3 is a diagram showing information about shapes and points shown in FIG. 2.

FIG. 3 shows roads in which stroke S1 is composed of links L1–L3. Stroke S2 is composed of links L4 and L5. Link L1 is defined by coordinates p11–p13; link L2 is defined by coordinates p13–p16; link L3 is defined by coordinates p16 and p17; link L4 is defined by coordinates p21, p22, and, p13; and link L5 is defined by coordinates p13, p24, and p25.

Link identifiers (ID) L1–L5 are respectively attached to the links. In a nationwide road network, each different link identifier has a unique identification number. The identifiers are represented as consecutive numbers within each stroke.

The information about the identifiers of links to be displayed is composed of the link identifiers of the starting and ending points of a row of links within each stroke. The information about the attributes is composed of information concerning the kinds of roads (such as highways and national roads), the number of lanes, and traffic regulations (such as one-way traffic), etc.

When a road is to be displayed, the controller 6 finds a string of consecutive link identifiers from the link identifiers of the starting and ending points of each stroke. Based on the found string of link identifiers, the controller gains access to information about shapes and points and extracts the coordinates of the points forming the links in each stroke. The extracted points are connected and displayed according to the information about the attributes. In this way, a road map is presented on the display device 7.

Meanwhile, the data about roads used to establish a path to a destination is composed of information about the link identifiers of the links for the path and information about a network. The information about the link identifiers of the links for the path comprises link identifiers, linking cost, and a pointer pointing to the network information, which describes how one road link is connected to other links. For instance, the information contains information indicating that link A is connected to links B, C, and D.

When the user is guided, the controller 6 computes the optimum path from the present location to the destination, using information about the linking cost and network information. The path is specified as a string of link identifiers. Then, the controller 6 gains access to information about the shapes and points, based on the string of link identifiers. Points given by coordinates specified by the information about the shapes and points are connected. Finally, the path to the destination is displayed in highlighted form on the display device 7.

As mentioned above, the data about the roads to be displayed is related to the data about the roads establishing the path. When the path to the destination is established, the information about the shapes and points is accessed by reference to the link identifiers. The path to the destination can be displayed in highlighted form.

Figure 4:
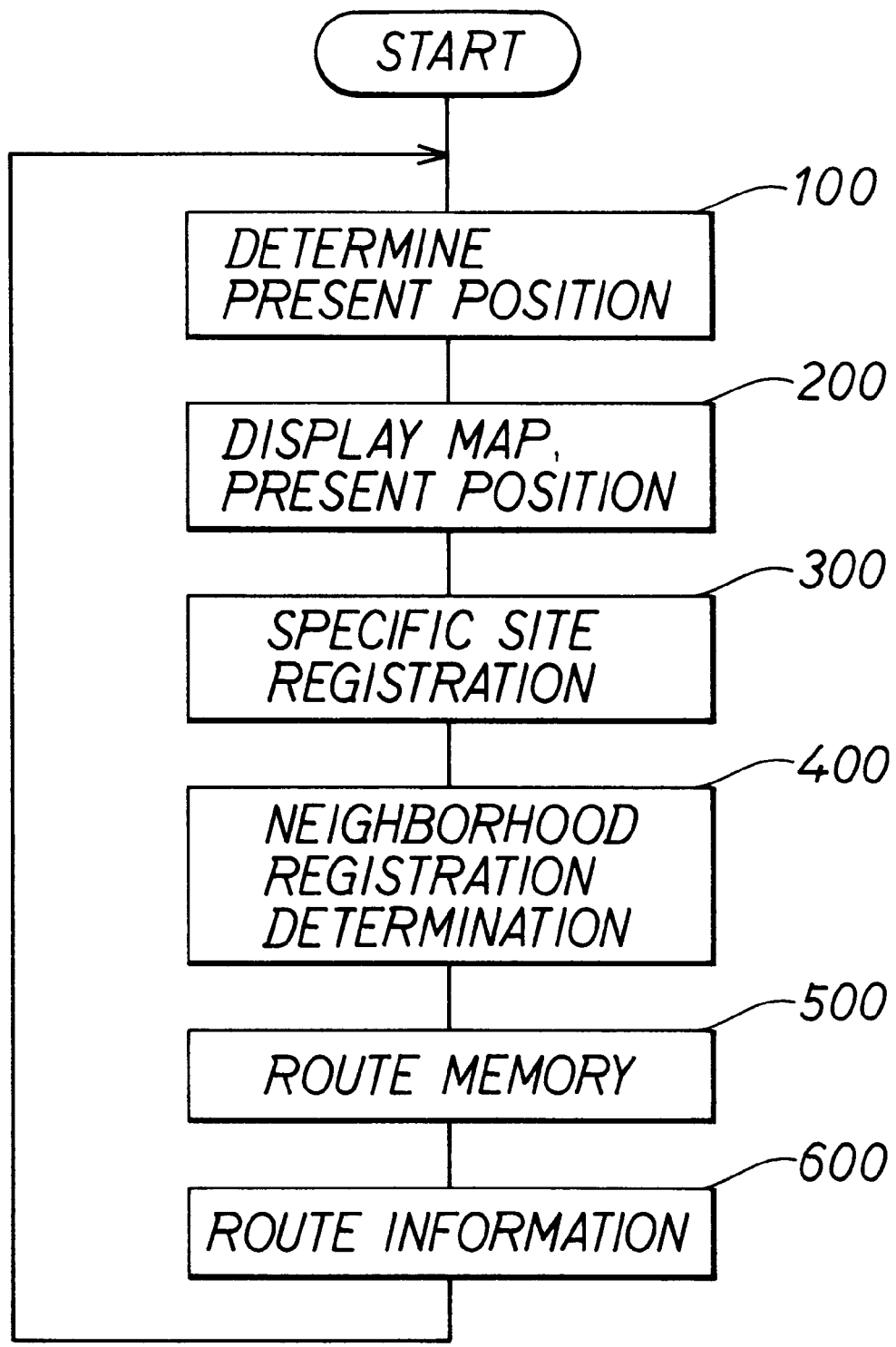
FIG. 4 is a flowchart showing main operations performed by the controller shown in FIG. 1.

Main operations performed by the controller 6 are next described by referring to the flowchart of FIG. 4. When the ignition (IG) switch is turned to the START position, the controller 6 receives power from the battery installed on the vehicle and repeatedly performs processing shown in FIG. 4.

First, processing (Step 100) for locating the present position is performed. For this purpose, the coordinates of the present position are found from the output signals from the GPS receiver 1, gyro 2, and wheel speed sensors 3. Then, processing (Step 200) for displaying the present position and a road map is carried out. In particular, data about roads to be displayed is read from the map data memory 4, and a road map containing the present position of the vehicle is displayed on the display device 7. This processing involves processing for bringing the present position of the vehicle onto one of the displayed roads.

Then, processing (Step 300) for registering locations is performed. Locations are automatically or manually registered or deregistered. The registered locations refer to positions (e.g., the driver's house) at which the driver frequently stops his vehicle.

Figure 5:
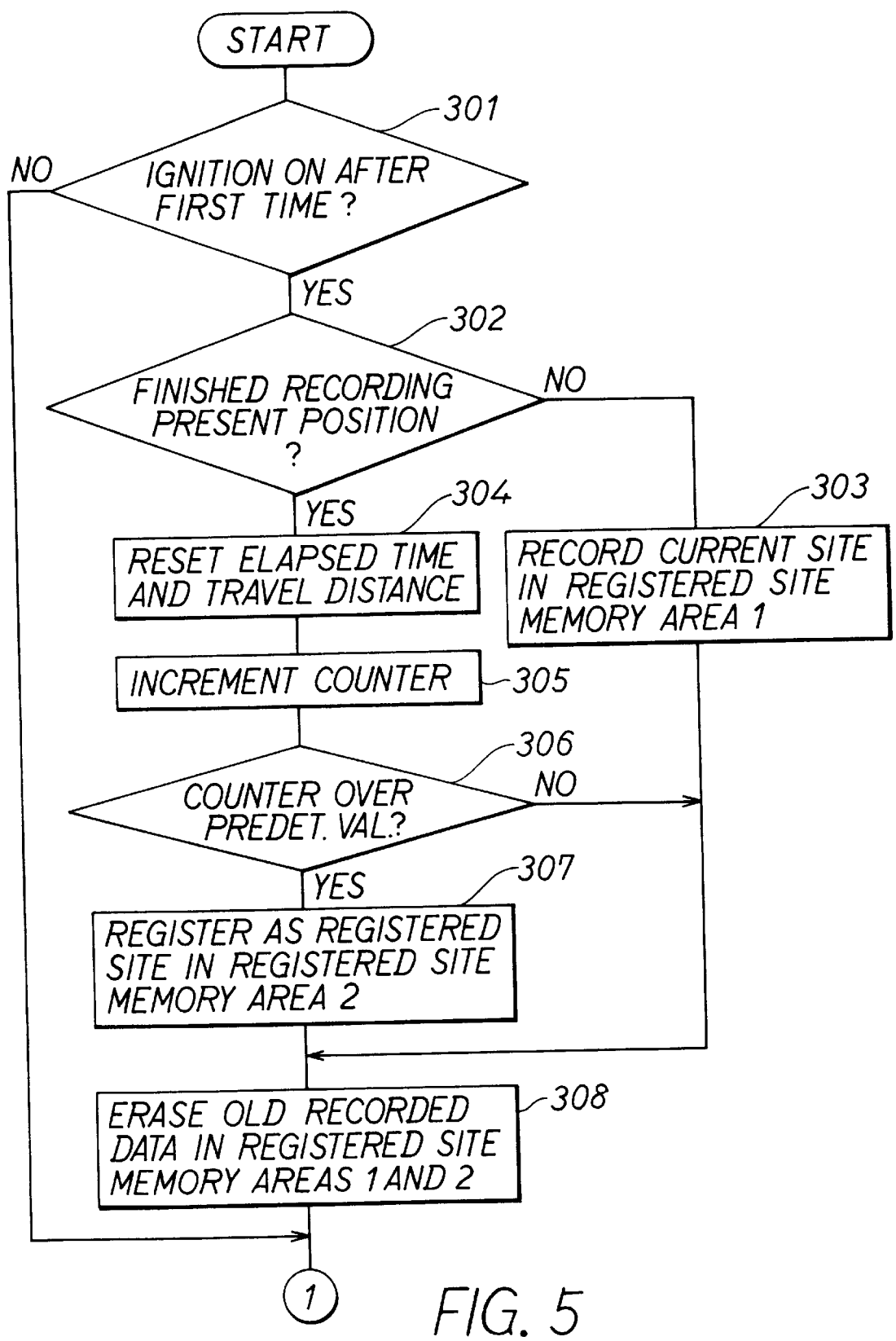
FIG. 5 is a flowchart showing operations of the flowchart of FIG. 4 used to locate a registered location.

Detailed processing of this registration is shown in FIG. 5. First, the ignition switch is turned to the START position. A decision is made as to whether it is the first processing (Step 301). If so, a decision is made as to whether the present position located by the processing 100 is already stored in the registered location storage area 1, i.e., whether. the present position agrees with any one of the locations stored in the storage area 1 (Step 302).

If the present position is coincident with none of the registered locations, then the coordinates of the present position are stored in memory (Step 303) as shown in FIG. 7. Storage regions for storing the elapsed time, the distance traveled, and the total count are provided in relation to the coordinates of the present position. The period of time elapsing before the execution of a storing operation or resetting operation as described later is updated by processing not shown. Alternatively, the distance from the point at which the storing operation or resetting operation is done is updated according to the output signals from the wheel speed sensors 3.

If the present position agrees with any one of the registered locations, the elapsed time and distance traveled obtained at this location are reset (Step 304). The total count of a counter incorporated in the controller 6 is incremented (Step 305). Then, a decision is made as to whether the total count has reached a given value (Step 306). If the given value is reached, this location is taken as a registered location. Its coordinates are stored in registered location storage area 2 as shown in FIG. 7 (Step 307). This storage area 2 has storage regions for storing the elapsed time and distance traveled in association with the coordinates of the registered location. These are updated by processing not shown, in the same way as in the case of the storage area 2.

Elapsed time and distance traveled are automatically stored in the registered location storage areas 1 and 2. Of these two kinds of information, those pieces of information which represent values exceeding given values are regarded as old information and deleted from the storage areas (Step 308).

Accordingly, in the above-described processing for locating registered locations, when the IG switch is turned to the START position, the present location is stored. If this location is often detected repeatedly, then this location is automatically stored as a registered location. However, if this location is not repeatedly detected before a given period of time elapses or a given distance is traveled, then this location is regarded as an unregistered location and thus deleted from the memory area.

Figure 6:
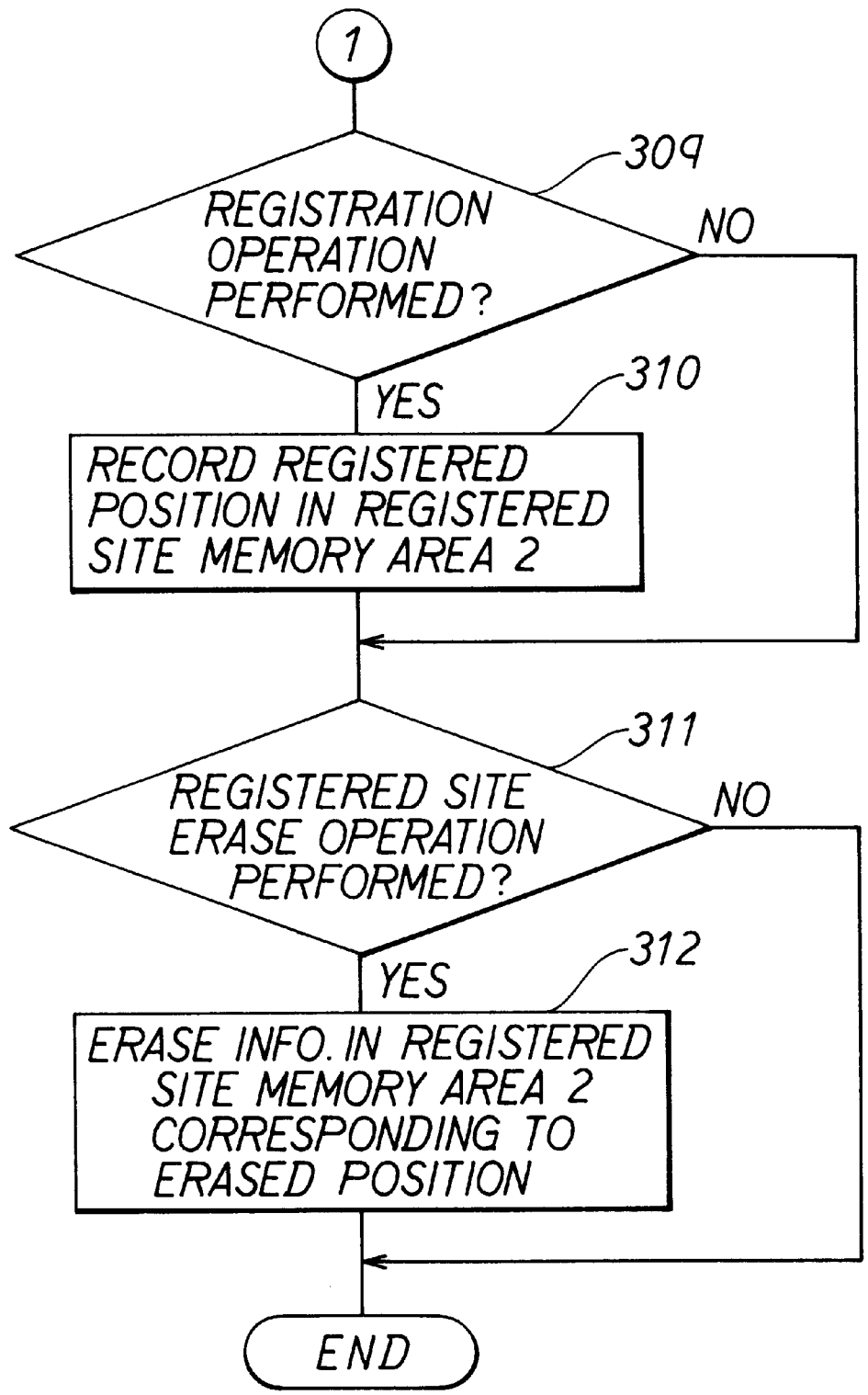
FIG. 6 is a flowchart showing operations performed subsequently to the operations shown in FIG. 5.

Besides the automatic registration, locations can be registered manually. When the input device 5 is operated to register a location (e.g., when a position on the viewing screen is registered), or when the location is identified by entering its telephone number, address, or the like, the result of the decision made by step 309 shown in FIG. 6 is YES. Then, the coordinates of the registered location are stored in the registered location storage area 2. In this case, however, no data is deleted when a given period of time elapses, unlike the above-described processing.

When the input device 5 is operated to delete one registered location (e.g., when the positions stored in the registered location storage area 2 are displayed on the viewing screen and one of them is deleted from the memory area), the result of the decision made in Step 311 is YES. The information corresponding to the deleted position is deleted from the registered location storage area 2.

Then, processing (Step 400) for making a decision as to whether the vehicle is near one of the registered locations is performed. This processing is shown in greater detail in FIG. 8. First, a decision is made as to whether the present position located by the processing 100 is within a given distance from any one of the registered locations stored in the storage area 2 (Step 401). The "given distance" denotes a region that is present about the registered position and estimated to contain at least one road included in the path. For example, this region may be a circle 300 m in radius. If the present position is within the given distance from any one registered position, a flag indicating closeness to one registered location is set (turned on) (Step 402). If not, the flag is reset (Step 403).

Figure 9:
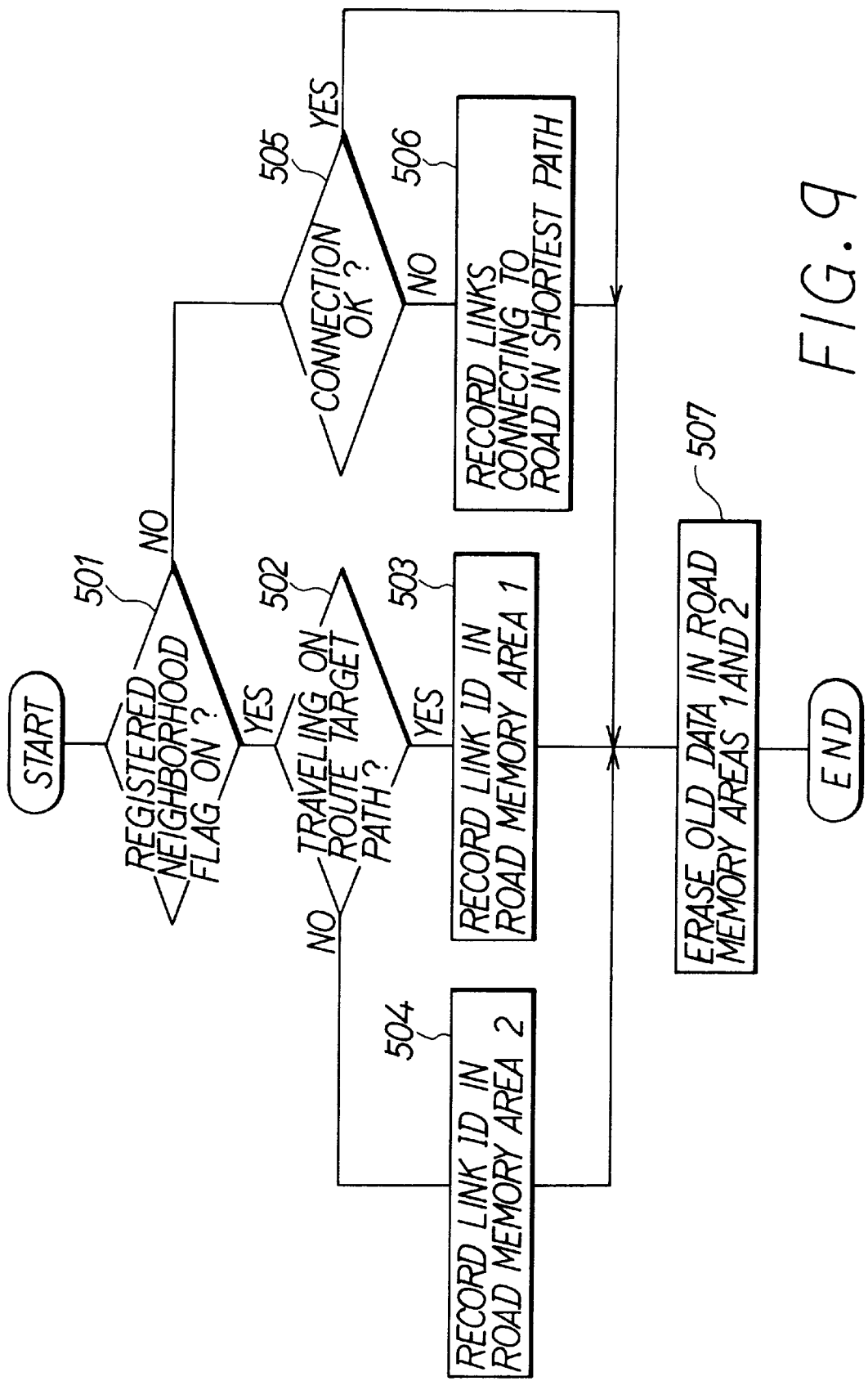
FIG. 9 is a flowchart showing operations of the flowchart of FIG. 4 used to store data about roads.

Thereafter, processing for storing data about roads (Step 500) is performed. This is shown in greater detail in FIG. 9. First, a decision is made as to whether the flag indicating the closeness to a registered location is set (Step 501). If the flag is set, a decision is made as to whether the vehicle is going down a road included in the path (Step 502). This decision can be made based on the present location located by the processing 100. This principle also applies to the following description. If the vehicle is going down one road included in the path, the link identifier of this road is stored in the road storage area 1 (Step 503). If not, the link identifier is stored in the road storage area 2 (Step 504).

Figure 10:
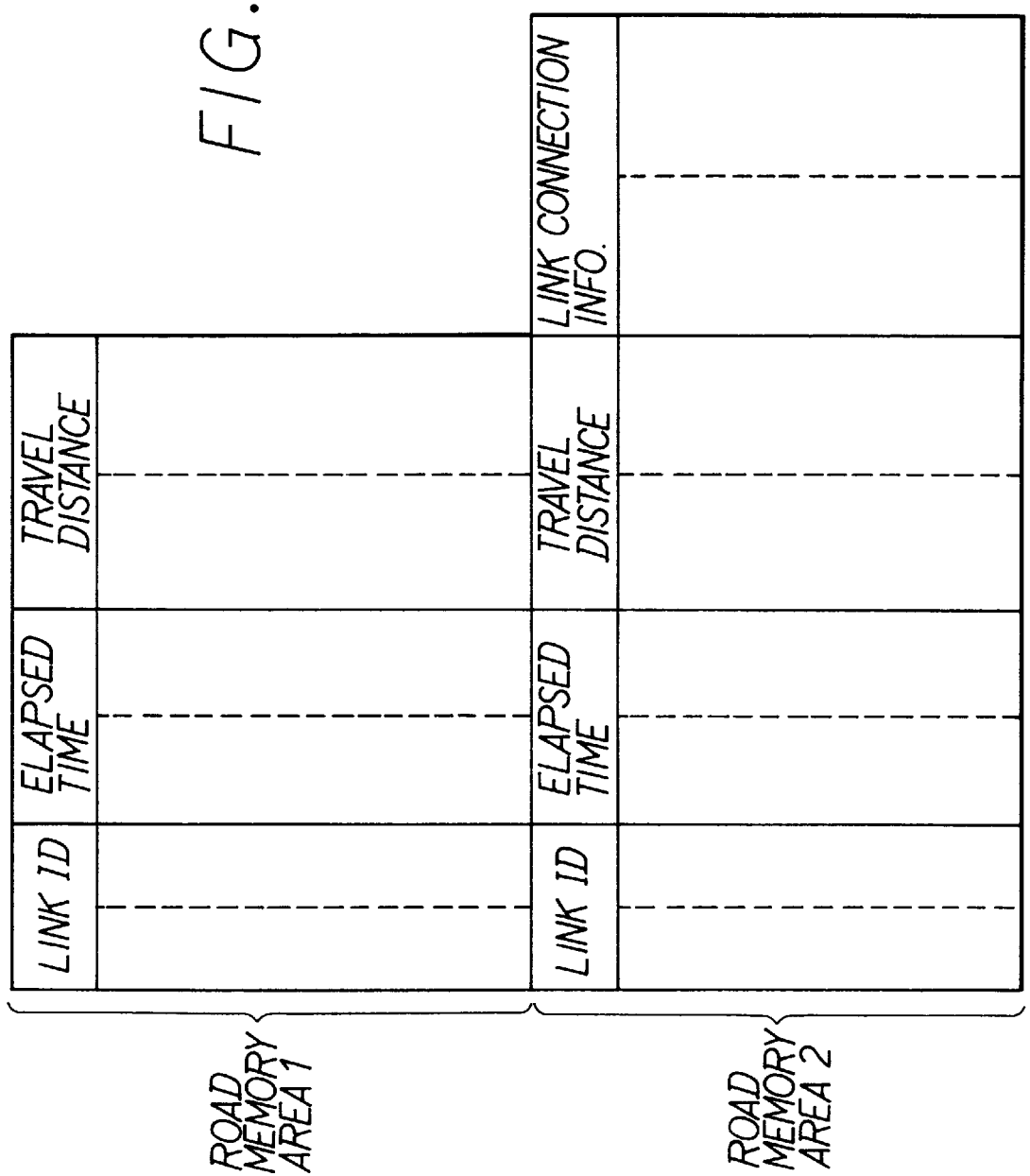
FIG. 10 is a diagram showing the structure of road storage areas of the first embodiment.

The structures of the road storage areas 1 and 2 are shown in FIG. 10. These storage areas 1 and 2 have storage regions for storing elapsed time and distance traveled in association with the link identifier. These two kinds of data stored are updated by processing not shown in the same manner as in the case of the registered storage areas 1 and 2. Since the link identifiers of roads located outside the path are stored in the road storage area 2, as the vehicle goes, a string of link identifiers subsequent to the link identifier of the starting place is stored in association with the link identifier of the starting place.

If the vehicle is not near any one registered location, the flag indicating closeness to any registered location is reset. The result of the decision made in Step 501 is NO. Then, a decision is made as to whether the road stored in the road storage area 2 is connected with any road included in the path (Step 505) by reading information about the connection of the link corresponding to the link identifier.

If the road is connected with none of the roads in the path, a string of links permitting connection with any one road included in the path with the shortest distance is found from the identifier of the last link included in the link connection information. The identifiers of the found links are included in the link connection information. Elapsed time and distance traveled are stored in the registered location storage areas 1 and 2. Of these two kinds of information, those pieces of information which represent values exceeding given values are taken as old information and deleted from the storage areas (Step 507).

Due to the processing for storing road information, the link identifiers of roads that are close to registered locations and routinely or frequently employed by the user can be stored in memory. These stored roads are used when a path to a destination is calculated. It is considered that these roads are nearby the registered locations and often used by the user. The cost of the linking using these roads is set low in calculation so that the path to the destination can be readily established including these roads. This will be described in greater detail below.

Then, processing (Step 600) for guiding the user through the path is conducted. This processing is shown in greater detail in FIG. 11. First, a decision is made as to whether the guidance is ready or not (Step 601). If the input device 5 is operated to register a destination (e.g., where a position on the viewing screen is registered as a destination), or if the location is registered as a destination by entering its telephone number, address, or the like, and if an instruction to start the guidance is issued, the result of the decision is YES.

Subsequently, calculations are performed to establish a path from the starting place to a destination using the path road data stored in the map data memory 4 and the data stored in the road storage areas 1 and 2 (Step 602). In these calculations, the position of the link closest to the present position is taken as a starting place. The position of the link closest to the established destination is taken as a terminal. The path from the starting place to the destination is established by making use of a calculation of the cost, using Dijkstra's algorithm. For example, the cost of going over the path that includes links, starts with the starting place, and ends with the destination is found, using Eq. (1) below $$\text{path cost} = \text{link length} \times \text{road width coefficient} \times \text{road kind coefficient} \quad (1)$$

where the link length is the distance between two nodes, the road width coefficient is set according to the width of the road, and the road kind coefficient is set according to the kind of road (e.g., the road is a toll road). The link length, road width coefficient, and road kind coefficient are stored as link-identifying information related to the linking cost.

Figure 12:
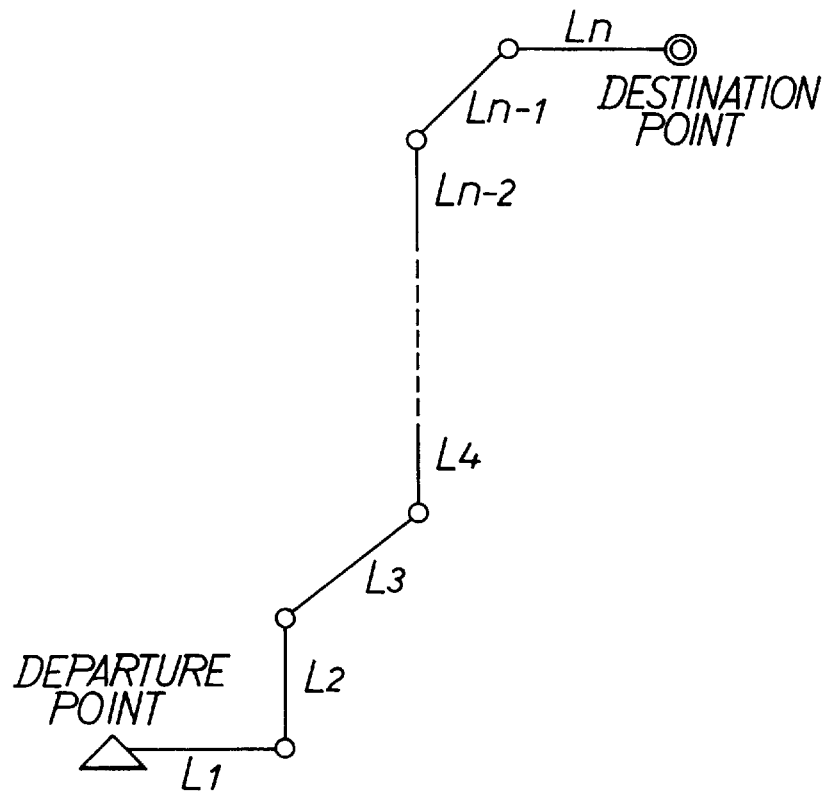
FIG. 12 is a diagram showing a string of link identifiers (IDs) from a starting place to a destination in the first embodiment.

Various paths from the starting place to the destination result in various total costs. Of these paths, the path giving the minimum total cost is established as the best path. The path giving the minimum cost is followed from the destination to the starting place in order. The sense is reversed, and the path from the starting place to the destination is specified as a string of link identifiers as shown in FIG. 12.

In the above-described calculations of the path, links specified by the link identifiers stored in the road storage areas 1 and 2 are also used. In this case, if the cost of using these links is made smaller than the cost of using any other link specified by the link identifiers included in the path road data (e.g., the cost is reduced to 0) in the calculations, then the path to the destination including the stored roads near the registered locations can be established.

Access to information about shapes and points is obtained using the string of link identifiers indicating the path to the destination. These shapes and points are connected and the path to the destination is displayed on the display device 7 in highlighted form (Step 603). Accordingly, in this embodiment, roads that are near the registered locations and often used by the user are noted by the controller and stored in memory. The path to the destination can be established so as to include these roads. Therefore, the apparatus can guide the user through the path according to the user's experiences, practice, and habit.

In the above embodiment, data regarding roads that are near the registered locations but may or may not be included in the path are stored in memory. Data about only roads that are near the registered locations and included in the path may be stored in memory. Alternatively, data about only roads existing near the registered locations but outside the path may be stored in memory. In the former case, the path can be established using only data concerning the path. Therefore, this operation is easy to perform. In the latter case, if a road that is near any registered location and often used by the user is not included in the original roads forming the path, then this path can be established using that nearby road.

Furthermore, in the above embodiment, the path is calculated while greatly suppressing the cost using a stored road near any registered location. This registered road may be always included in the path to the destination, and the path may be computed from the end of the stored road.

Figure 8:
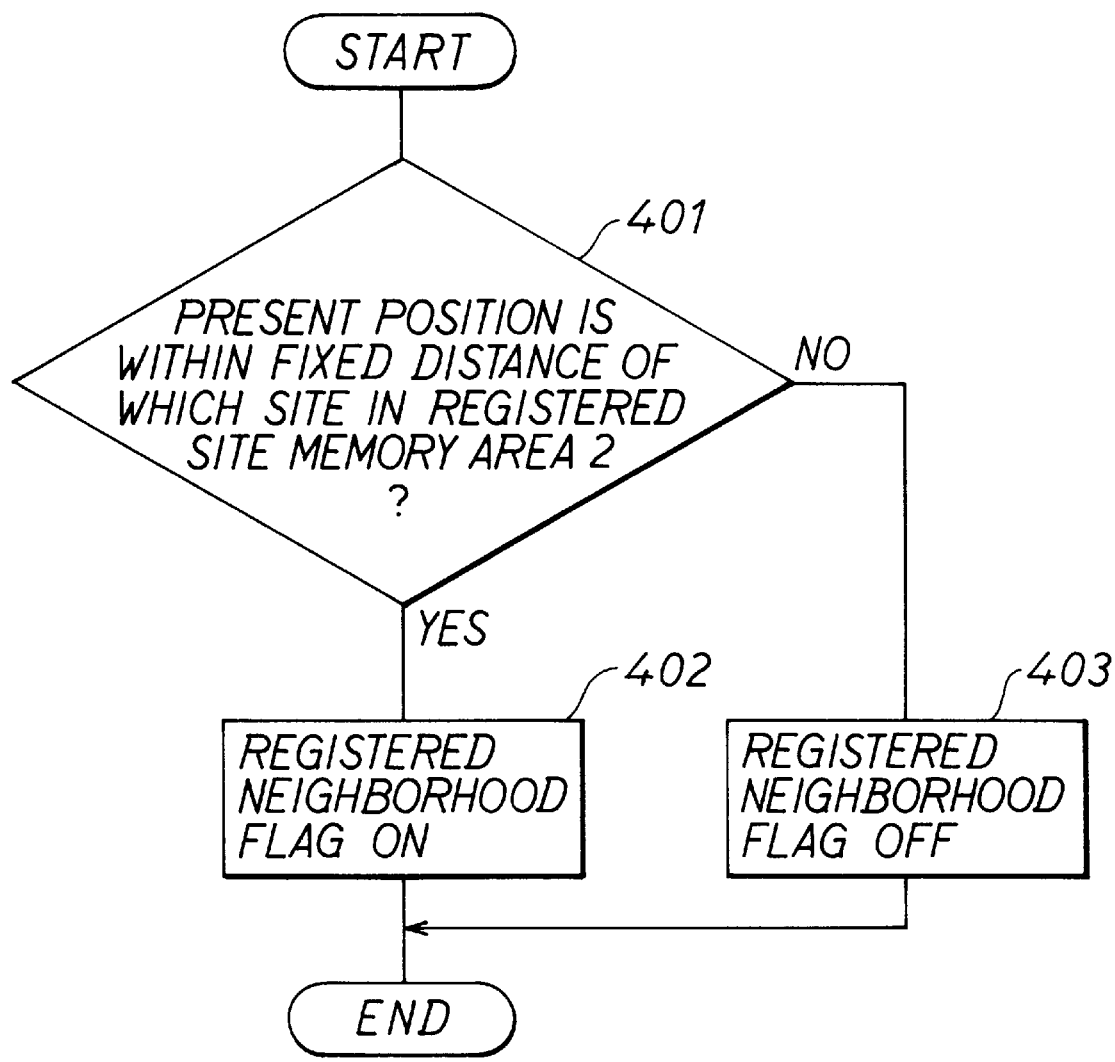
FIG. 8 is a flowchart showing operations for making a decision as to whether the vehicle is near any registered location in the first embodiment.

In Step 401 shown in FIG. 8, a decision is made as to whether the present location is within a given distance from any registered location, i.e., whether the present location is near any registered location. This distance used for the decision may be made different between urban and rural areas. For example, the distance used for rural areas is made larger than the distance used for urban areas for the following reason: rural areas have fewer roads than urban areas and so the route passes by registered locations in rural areas less frequently than in urban areas.

Additionally, in the above embodiment, a decision is made as to whether the present position is near any registered location, and the presently used roads are stored in memory. Roads near the registered locations may be previously listed. When data about the road passing by the present location agrees with data about any road on the list, the data about the road passing by the present location may be stored in the road storage areas.

In a second preferred embodiment of the present invention, the controller learns the starting place and destination and stores them in memory in calculating a path. This path to the destination is established using the starting place and destination.

Figure 13:
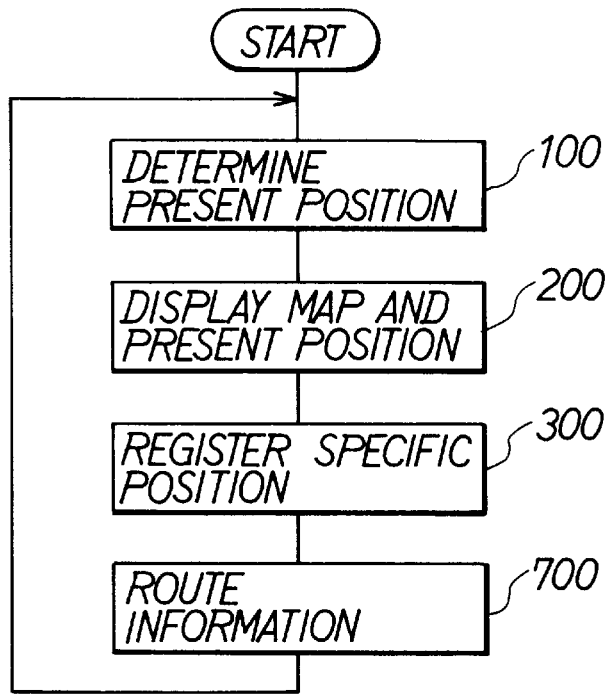
FIG. 13 is a flowchart showing main operations performed by a controller in a second preferred embodiment of the present invention.

In the second embodiment, the controller 6 performs processing different from the processing performed in the first-mentioned embodiment. The main operations of the controller 6 shown in FIG. 13 include Step 100 for locating the present position, Step 200 for displaying the present position and a road map, and Step 300 for locating registered locations in the same way as in the first-mentioned embodiment. Subsequent to these kinds of processing, Step 700 for guiding the user through a path is conducted.

Figure 14:
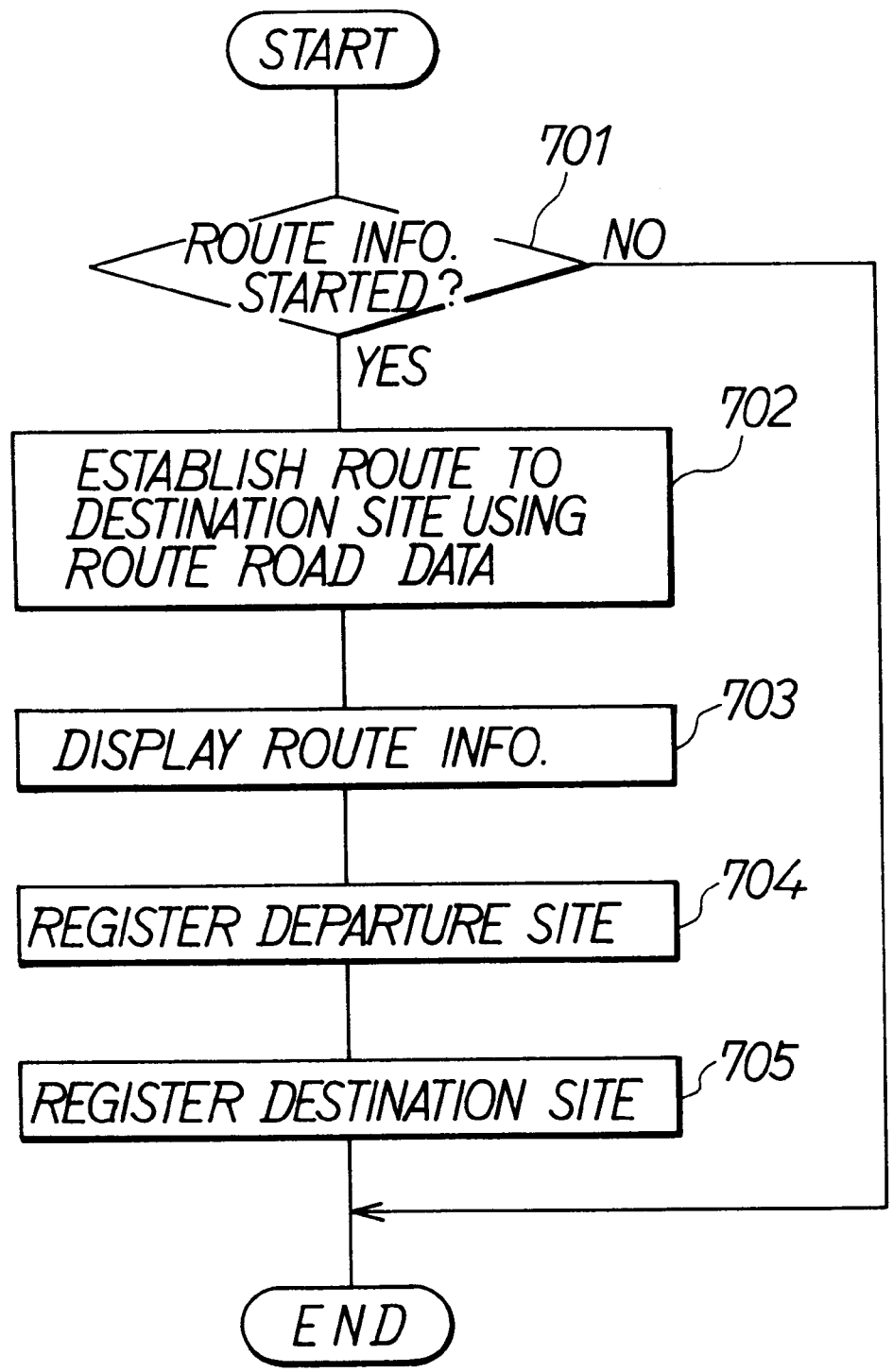
FIG. 14 is a flowchart showing operations of the flowchart of FIG. 13 used to guide a user through a path.

Step 700 for guiding the user through the path is shown in greater detail in FIG. 14. Steps 701 and 703 are similar to Steps 601 and 603 of the first embodiment. A decision is made as to whether guidance should be started (Step 701). A path from a starting place to a destination is calculated, using path road data stored in the map data memory 4 to establish the path (Step 702).

In the first embodiment, the link position closest to the present location is taken as the starting place and the link position closest to the established destination is taken as the destination in the calculations. In the present embodiment, if the present location (actual starting place) when the guidance is started is at or near any registered location, it is assumed that the registered starting place lies in any road within the path. If the established destination is near any registered location, it is assumed that the registered destination is located in any road within the path. Using these starting place and destination, the path is found by calculations.

Figure 15:
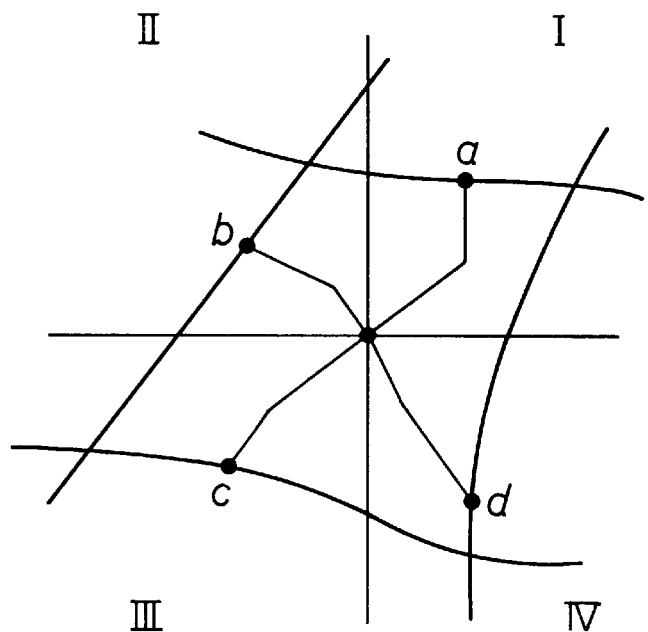
FIG. 15 is a map showing the registration of a starting place in the second embodiment.

Referring to FIG. 15, if the actual starting place is near any registered location, this registered location is taken as an origin. Directions to the destinations are divided into four quadrants I–IV. Starting places a–d are present in roads that form the path and are included in the four quadrants, respectively. These starting places are stored in memory. If the actual starting place is near any registered location, the path is computed using the starting place lying in the same direction as the destination. The bold lines indicate roads that can be included in the path. The thin lines indicate roads not included in the path.

Where an established destination is near any registered location, a destination in a road included in the path is registered for each of the four quadrants I–IV that divide directions of starting places. The path is calculated using the destination lying in the same direction as the starting place. Where the actual starting place or established destination is near any registered location, the use of these starting places and destinations makes it possible to establish the path to the destination to include positions in paths often used by the user.

Figure 16:
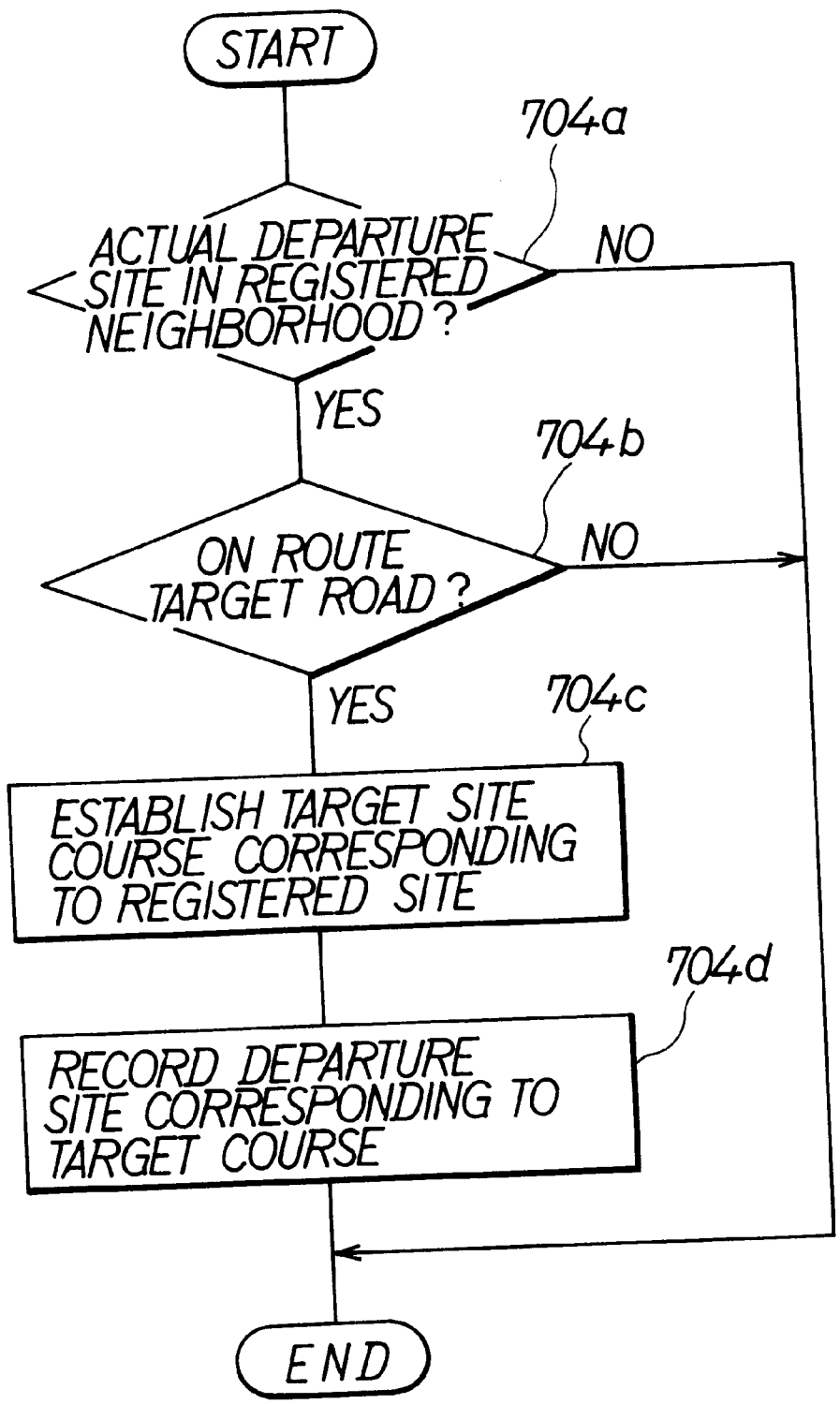
FIG. 16 is a flowchart showing operations of the flowchart of FIG. 14 used to register a starting place.

Step 704 is processing for registering such starting places. This is described in detail by referring to FIG. 16. In guiding the user through the path, a decision is made as to whether the actual starting place is near any registered location (Step 704a). If so, a decision is made as to whether the present position has entered any road in the path (Step 704b). If the first entry is found, a decision is made as to which of the four quadrants I–IV does the direction of the registered location to the destination belong (Step 704c). The coordinates of the present location are registered as a starting place in association with the direction to the destination (Step 704d). Therefore, as shown in FIG. 18, the coordinates of starting places are registered in association with the coordinates of the registered locations for each of the quadrants I–IV.

Figure 17:
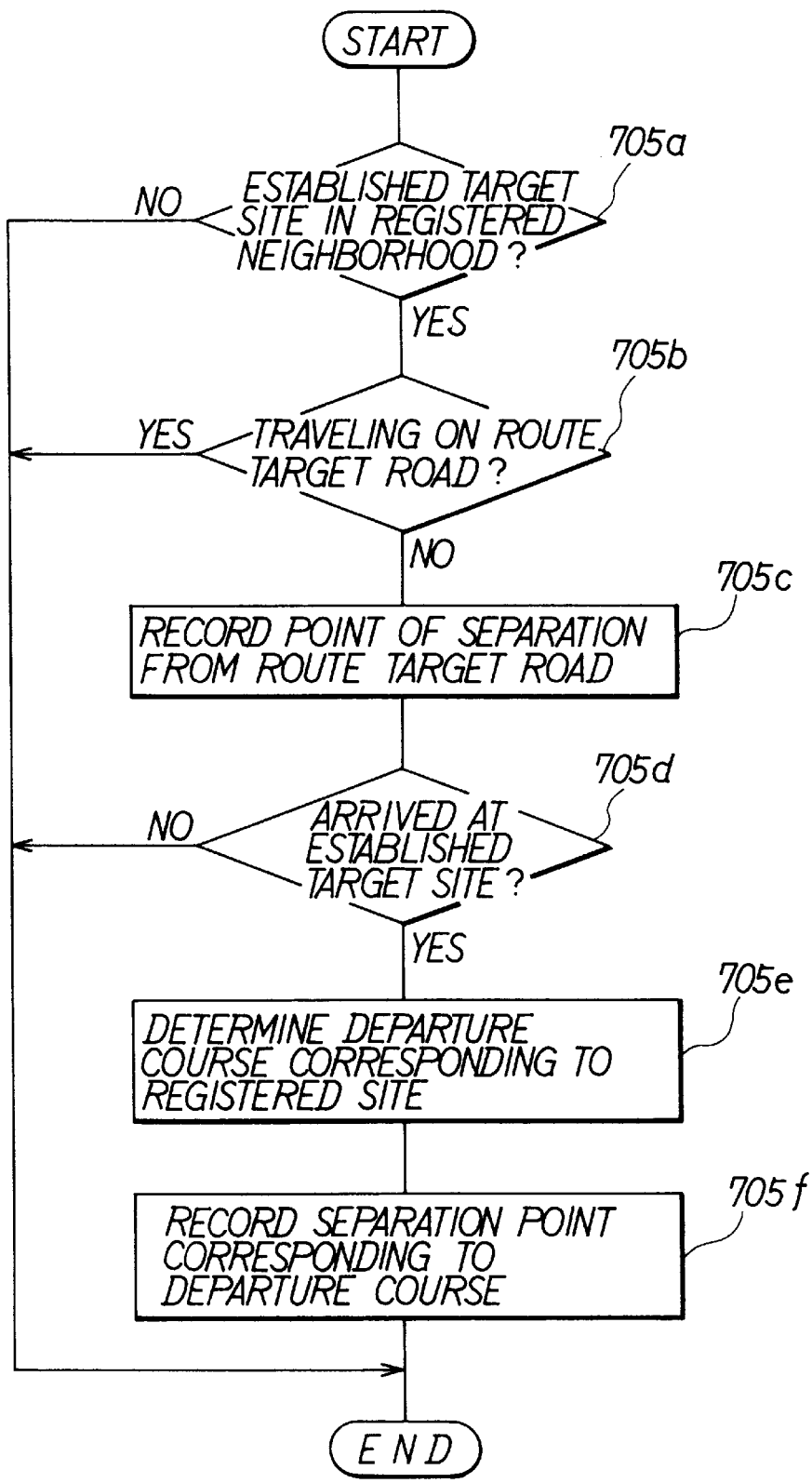
FIG. 17 is a flowchart showing operations of the flowchart of FIG. 14 used to register a destination.

To register a destination, Step 705 is carried out. This Step 705 is shown in greater detail in FIG. 17. First, a decision is made as to whether an established destination is near any registered location (Step 705a). If so, a decision is made as to whether the vehicle is going down any road included in the path (Step 705b). If the vehicle leaves this road included in the path at a position, then this position is stored in memory (Step 705c). If the vehicle departs from this path road several times, the stored data is updated to store the latest departure position.

Then, a decision is made as to whether the vehicle has reached the established destination (Step 705d). If so, a decision is made as to which of the four quadrants I–IV does the direction of the registered location to the starting place belong (Step 705e). The latest departure position is registered as a destination corresponding to this direction to the starting place (Step 704d). Therefore, as shown in FIG. 18, the coordinates of the destination are stored in memory according to the coordinates of the registered location for each of the quadrants I–IV.

Whenever the apparatus guides the user in such a way that the actual starting place or established destination is brought close to any registered location, the coordinates of the starting place and the coordinates of the destination are successively stored in memory for each registered position for each of the quadrants I–IV. In Step 702, the path is calculated. If a location close to any registered position is taken as an actual starting place, or if a location near any registered position is taken as an established destination, the starting place and destination are established using the coordinates of the starting place or destination described above.

In the first and second embodiments described above, the path to the destination is established in relation to registered positions. In a third preferred embodiment of the present invention, roads frequently used by the user are stored in memory regardless of registered positions, and a path to a destination is established using these stored roads.

Figure 19:
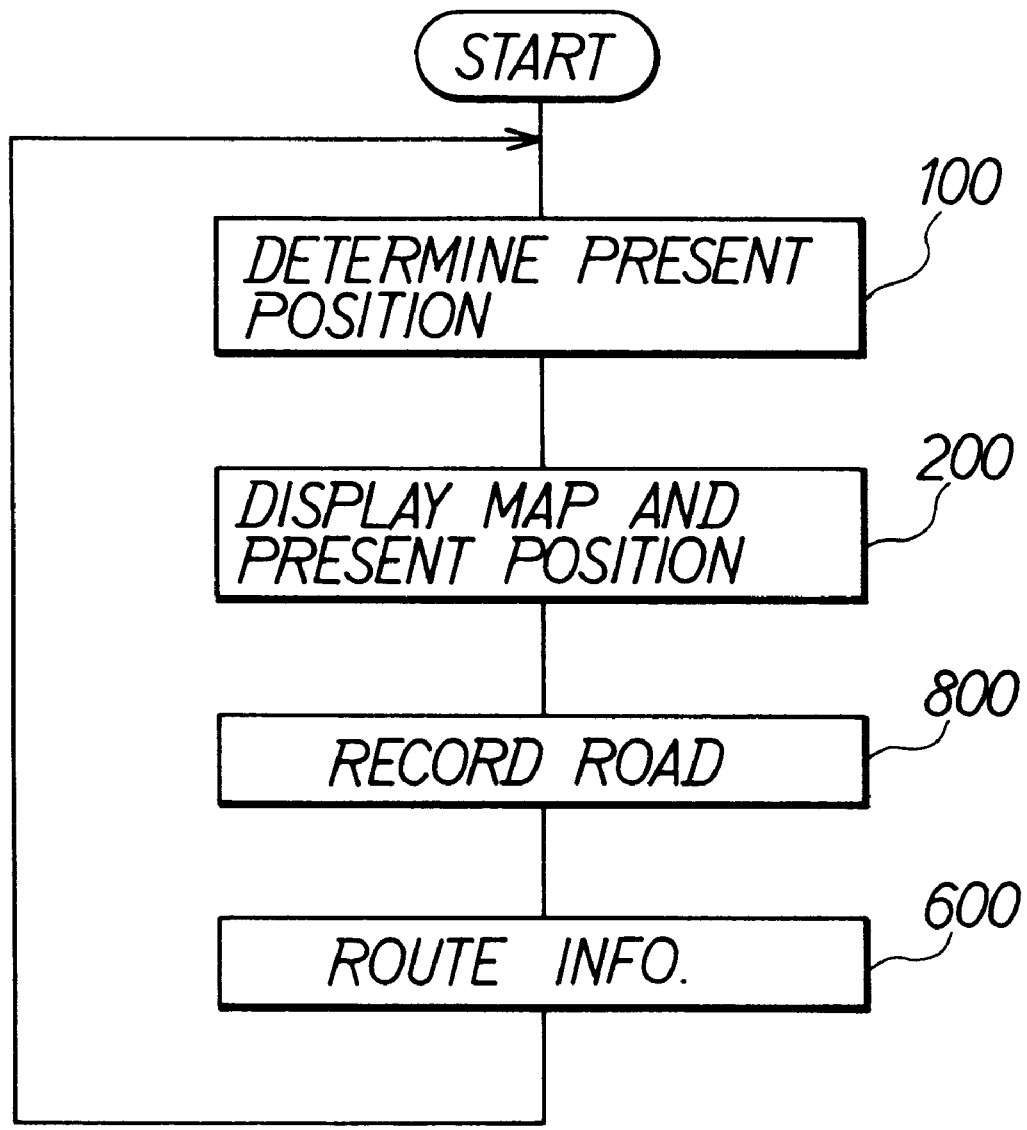
FIG. 19 is a flowchart showing main operations performed by a controller in a third embodiment of the present invention.

This third embodiment is similar to the first embodiment except for the processing performed by the controller 6. Main operations performed by the controller 6 are shown in FIG. 19 and include processing 100 for locating the present position and processing 200 for displaying the present position and a road map. These two kinds of processing 100 and 200 are the same as their counterparts of the first embodiment. Subsequent to these two kinds of processing, Step 800 for storing data about roads is carried out.

Figure 20:
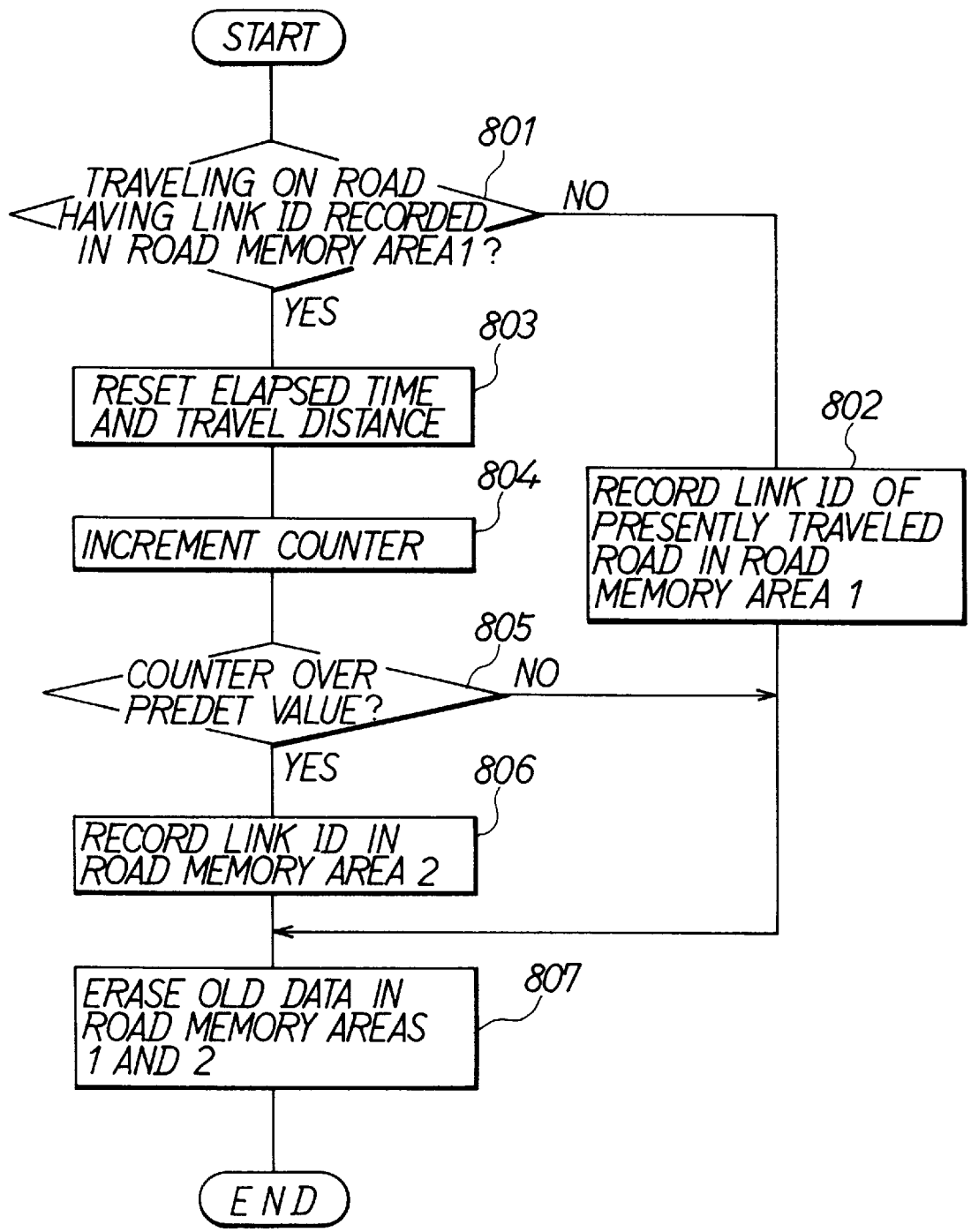
FIG. 20 is a flowchart showing operations of the flowchart of FIG. 19 used to store data about roads.
Figure 22A:
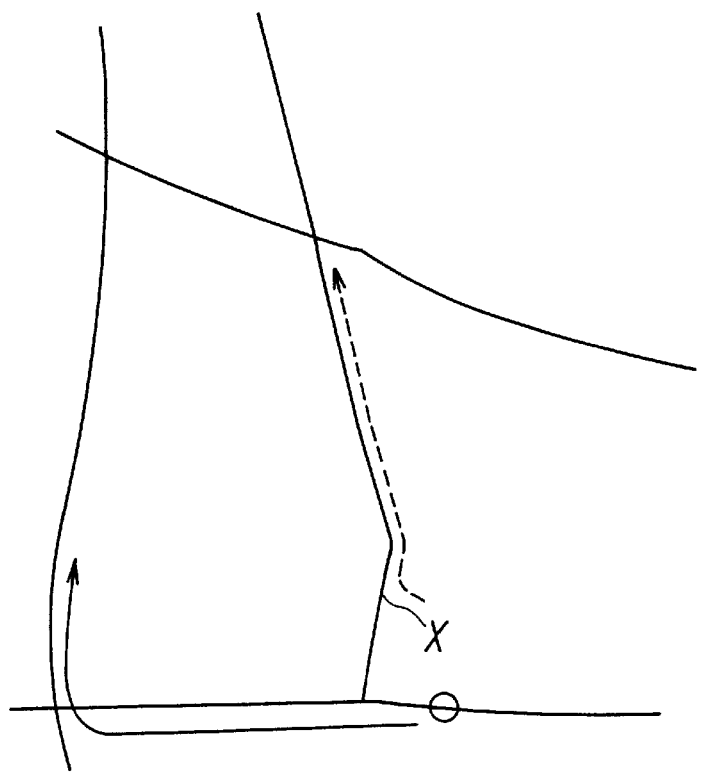
FIGS. 22A and 22B show maps showing problems with the prior art vehicular navigational system.
Figure 22B:
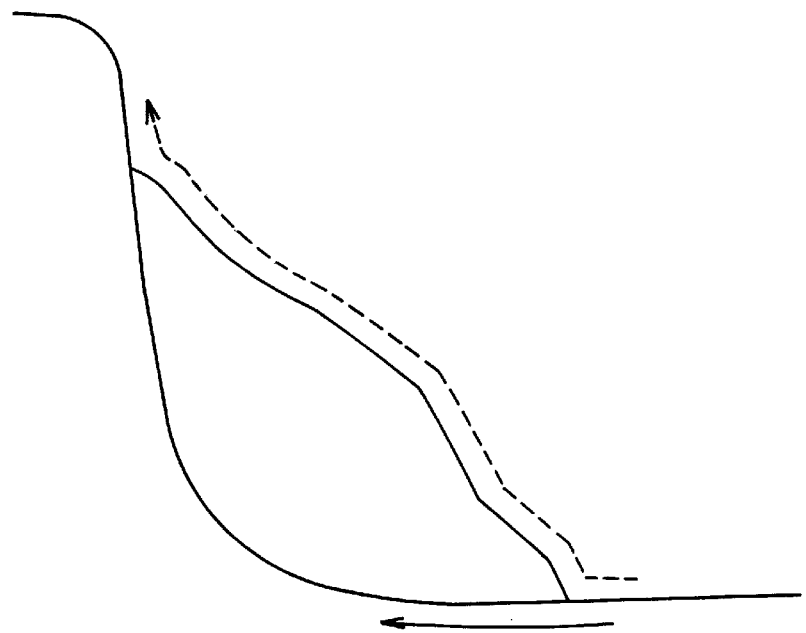

Step 800 for storing data about roads is shown in greater detail in the flowchart of FIG. 20. First, a decision is made as to whether the actually used road is a road having any link identifier stored in the road storage area 1 (Step 801). If the vehicle is presently going down a road having data not stored in the road storage area 1, the link identifier of the presently used road is stored in memory (Step 802).

The memory structure of the road storage area 1 is shown in FIG. 21. Storage regions for storing elapsed time and distance traveled are provided in relation to link identifiers (ID). The contents of these storage regions are updated by processing not shown in the same way as in the first embodiment. Where a link identifier of a road located off the route is stored, as the vehicle goes forward, information about connection of links (i.e., the first link identifier and a string of link identifiers subsequent to the first link identifier) is stored in relation to the first link identifier.

If the presently used road is stored in the road memory region 1, the corresponding elapsed time and distance traveled are reset (Step 803), and the total count is incremented (Step 804). Then, a decision is made as to whether the total count has reached a given value (Step 805). If so, its link identifier is stored in the road storage area 2 (Step 806), as shown in FIG. 21. This road storage area 2 further has storage regions for storing elapsed time and distance traveled. The contents of these storage regions are updated by processing (not shown in the same way as in the case of the road storage area 1.

Those pieces of the information which are automatically stored in the road storage areas 1 and 2 and represent elapsed times and traveled distances exceeding given values are taken as old information and deleted (Step 807). In this manner, the link identifiers of roads used with frequencies exceeding a given value are stored in the road storage area 2.

Figure 11:
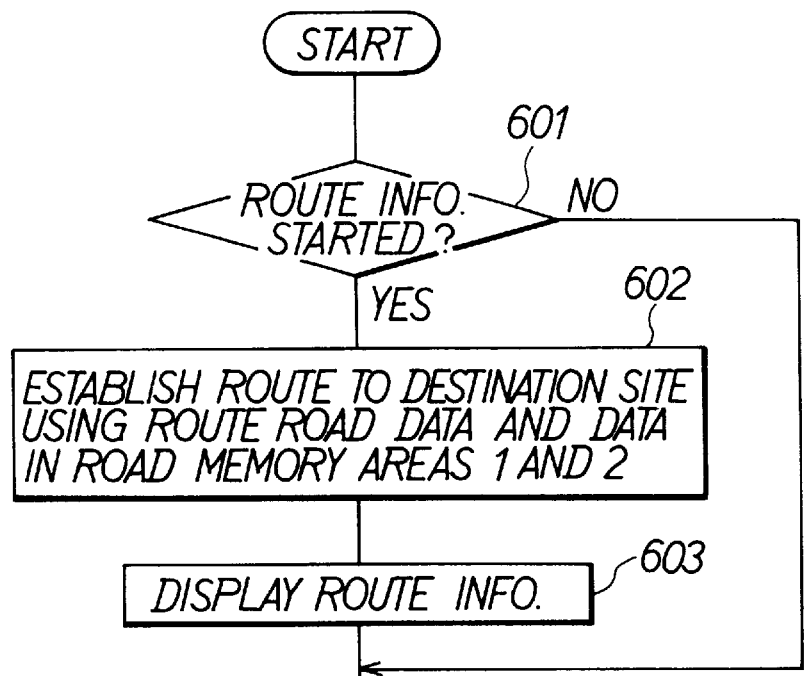
FIG. 11 is a flowchart showing operations of the flowchart of FIG. 4 used to guide a user through a path.

The path-guiding processing 600 of this embodiment is fundamentally the same as that of the first embodiment which has been described in connection with FIG. 11. In processing 602 for establishing a path, however, the path is calculated using the data stored in the road storage area 2, such that the cost of using the link is smaller than the cost of using any other link specified by the link identifiers in the path road data. For example, the cost of using the link is set to 0. Consequently, the route to the destination including a road frequently used by the user can be established.

In the first through third embodiments described above, the apparatus gives the user guidance on the route by visually displaying the route to the destination. It is also possible to teach the user the route verbally as the vehicle travels the route. Furthermore, both functions may be used simultaneously.

In addition, in the above embodiments, data about roads near registered locations are stored in memory as the vehicle actually advances. Also, data about roads that are employed by the user and located near registered locations may be entered into the apparatus and stored there. In this case, a decision is made as to whether the entered road is near any registered location. If so, data about this road is stored in memory.

Further, in the above embodiments, the path to the destination is established on board. This operation may also be performed outside the vehicle such as in the user's home. For example, locations may be registered and roads near the registered locations may be stored in memory using a computer in the user's home.

In the first through third embodiments described above, data shown in FIGS. 7, 10, 18, and 21 are stored in the nonvolatile memory 6a.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A vehicular navigation system comprising:
present position detecting means for detecting a present position of a vehicle;
path data storage means for storing data about roads forming a path to a destination;
path establishing means for establishing said path from a starting place to said destination using the data about said roads forming said path;
path guiding means for guiding a user through said established path;
registered location storage means for storing data about registered locations including said data used by said path establishing means; and
actual road storage means for storing data about an actually used road in said registered location storage means, based upon said detected present position, said actually used road being a road that is actually used by the vehicle and located proximate to one of said registered locations;
wherein said path establishing means is for establishing said path to said destination using the data about said actually used road stored in said registered location storage means where said starting place is proximate to said registered location.

2. The vehicular navigation system of claim 1, further comprising registration permitting means for permitting the user to perform a registration operation, whereby said registered locations are stored in said registered location storage means.

3. A vehicular navigation system of claim 1, further comprising means for determining whether said vehicle is near the destination based on whether the present position is within a given distance from any of said registered locations.

4. A vehicular navigation system of claim 1, wherein said path is established from data about said roads forming said path and data stored by said actual road storage means.

5. A vehicular navigation system comprising:
present position-detecting means for detecting a present position of a vehicle;
path data storage means for storing data about roads forming a path to a destination;
path establishing means for establishing said path from a starting place to said destination using the data about said roads forming said path;
path guiding means for guiding a user through said established path;
registered location storage means for storing data about registered locations; and
entry point processing means for detecting from said detected present position an entry point at which the vehicle enters one of said roads forming said path during vehicle travel, and for storing said entry point as a starting place in said registered location storage means during vehicle travel;
wherein said path establishing means is for establishing said path to said destination from said starting place stored in said registered location storage means where said starting place is proximate to one of said registered locations.

6. The vehicular navigation system of claim 5, wherein said entry point processing means is for storing a starting place detected while the user is being guided through said path in said registered location storage means for each one of different directions in connection with said registered locations.

7. The vehicular navigation system of claim 5, further comprising present position selecting means for selecting present positions where the vehicle comes to a stop more frequently than a predetermined frequency, taking said selected present positions as said registered locations, and storing said selected positions in said registered location storage means.

8. The vehicular navigation system of claim 5, further comprising registration permitting means for permitting the user to perform a registration operation, whereby said registered locations are stored in said registered location storage means.

9. A vehicular navigation system comprising:
present position-detecting means for detecting a present position of a vehicle;
path data storage means for storing data about roads forming a path to a destination;
path establishing means for establishing said path from a starting place to said destination using the data about said roads forming said path;
path guiding means for guiding a user through said established path;
registered location storage means for storing data about registered locations; and
departure processing means for, when said vehicle departs from said roads forming said path at a departure position, detecting said departure position from said present position during vehicle travel and storing said departure position in said registered location storage means during vehicle travel;
wherein said path establishing means is for establishing said path to said destination from said starting place stored in said registered location storage means while taking said departure position stored in said registered location storage means as the destination where said destination is proximate one of said registered locations.

10. The vehicular navigation system of claim 9, wherein said departure processing means is for storing said departure position as the destination detected while the user is being guided through said path in said registered location storage means for each one of different directions in connection with said registered locations.

11. The vehicular navigation system of claim 9, further comprising registration permitting means for permitting the user to perform a registration operation, whereby said registered locations are stored in said registered location storage means.

12. A vehicular navigation system comprising:
present position-detecting means for detecting a present position of a vehicle:
path data storage means for storing data about roads forming a path to a destination:
path establishing means for establishing said path from a starting place to said destination using the data about said roads forming said path;
path guiding means for guiding a user through said established path:
registered location storage means for storing data about registered locations: and departure processing means for, when said vehicle departs from said roads forming said path at a departure position, detecting said departure position from said present position and storing said departure positioning said registered location storage means;

wherein said oath establishing means is for establishing said path to said destination from said starting place stored in said registered location storage means while taking said departure position stored in said registered location storage means as the destination where said destination is proximate one of said registered locations:

further comprising present position selecting means for selecting present positions where the vehicle comes to a stop more frequently than a predetermined frequency, taking said selected present positions as said registered locations, and storing said selected positions in said registered location storage means.

13. A vehicular navigation system for use in a vehicle, said system comprising:

path data storage means for storing data about roads forming a path to a destination;

used road data storage means for storing data about first roads of roads actually used by the vehicle, said first roads being used by said vehicle more frequently than a predetermined frequency; and path establishing means for establishing the path from a starting place to a destination using the data about said roads forming the path and the data about said first roads, and for guiding a user through said path.

14. The vehicular navigation system of claim 13, further comprising actual road processing means for storing the data about said roads actually used by said vehicle, selecting second roads actually used by said vehicle more frequently than a predetermined frequency within a given period of time, and storing data about said second roads.

15. The vehicular navigation system of claim 14, further comprising deleting means for deleting data about the actually used roads from said road data storage means after a lapse of said given period of time.

16. A path setting apparatus comprising:

path data storage means in which data about roads forming a path to a destination are stored;

path establishing means for establishing said path from a starting place to said destination using the data about paid roads forming said path such that said established path has a minimum cost; and registered location storage means for storing registered locations and data about registered roads proximate said registered locations;

wherein said path establishing means is for establishing said path to said destination using the data about said roads forming said path and the data about said registered roads in such a way that a cost of using said registered roads located proximate one of said registered road locations is smaller than a cost of using any other road included in said path.

17. A vehicular navigation system comprising:

present position detecting means for detecting a present position of a vehicle;

path data storage means for storing data about roads forming a path to a destination;

path establishing means for establishing said path from a starting place to said destination using the data about said roads forming said path;

path guiding means for guiding a user through said established path;

registered location storage means for storing data about registered locations including said data used by said path establishing means; and actual road storage means for storing data about an actually used road in said registered location storage means, based upon said detected present position, said actually used road being a road that is actually used by the vehicle and located proximate to one of said registered locations;

wherein said path establishing means is for establishing said path from said starting place to said destination using the data about said roads forming said path and the data about said actually used road.

18. The vehicular navigation system of claim 17, wherein said path establishing means is for selecting a path having a minimum cost as said path from said starting place to said destination, for calculating a cost of using said actually used road based on the data about said actually used road to be smaller than a cost of using any other road included in said path and located proximate to one of said registered locations, and for calculating said cost of using said actually used road.

19. A vehicular navigation system of claim 17, further comprising means for determining whether said vehicle is near the destination based on whether the present position is within a given distance from any of said registered locations.

20. The vehicular navigation system of claim 17, wherein said actual road storage means is for storing data about said actually used road in said registered location storage means until said actually used road meets one of said roads forming said path where said actually used road is not included in said roads forming said path.

21. The vehicular navigation system of claim 20, wherein said path establishing means is for selecting a path having a minimum cost as said path from said starting place to said destination, for calculating a cost of using said actually used road based on the data about said actually used road to be smaller than a cost of using any other road included in said path and located proximate to one of said registered locations, and for calculating said cost of using said actually used road.

22. A vehicular navigation system comprising:

present position detecting means for detecting a present position of a vehicle;

path data storage means for storing data about roads forming a path to a destination;

path establishing means for establishing said path from a starting place to said destination using the data about said roads forming said path;

path guiding means for guiding a user through said established path;

registered location storage means for storing data about registered locations including said data used by said path establishing means;

actual road storage means for storing data about an actually used road in said registered location storage means, based upon said detected present position, said actually used road being a road that is actually used by the vehicle and located proximate to one of said registered locations; and present position selecting means for selecting present positions where the vehicle comes to a stop more frequently than a predetermined frequency, taking said selected present positions as said registered locations, and storing said selected positions in said registered location storage means.

23. A vehicular navigation system of claim 22, further comprising means for determining whether said vehicle is near the destination based on whether the present position is within a given distance from any of said registered locations.

* * * * *